United States Patent [19]

Welch et al.

[11] 4,331,558

[45] May 25, 1982

[54] POLYMERIZATION CATALYST AND PROCESS

[75] Inventors: Melvin B. Welch, Bartlesville, Okla.; Richard E. Dietz, Borger, Tex.

[73] Assignee: Phillips Petroleum Company, Bartlesville, Okla.

[21] Appl. No.: 197,456

[22] Filed: Oct. 16, 1980

Related U.S. Application Data

[63] Continuation-in-part of Ser. No. 968,156, Dec. 11, 1978, Pat. No. 4,243,552.

[51] Int. Cl.$^3$ .............................................. C08F 4/64
[52] U.S. Cl. .............................. 252/429 B; 526/142; 526/125; 526/114
[58] Field of Search ........................................ 252/429 B

[56] References Cited

U.S. PATENT DOCUMENTS 3,758,621 9/1973 Morikawa et al. ......... 252/429 B X
4,013,823 3/1977 Longi et al. ................ 252/429 B X

*Primary Examiner*—Patrick Garvin

[57] ABSTRACT

Alpha-olefins are polymerized employing a catalyst which forms on mixing a catalyst component A formed by milling together a magnesium halide or manganous halide with selected catalyst adjuvants comprising aryl carbonic acid esters followed by treatment of the resulting milled product with a halogenated tetravalent titanium compound and combining the product thus formed with a cocatalyst component B comprising at least one of an organoaluminum compound and an organoaluminum monohalide with or without an aromatic ester as a part of the cocatalyst system.

14 Claims, No Drawings

POLYMERIZATION CATALYST AND PROCESS

This is a continuation-in-part application of copending application having Ser. No. 968,156, filed Dec. 11, 1978, now U.S. Pat. No. 4,243,552.

The present invention relates to a catalyst, a method for making the catalyst, and a polymerization process employing the catalyst. In accordance with another aspect, this invention relates to an improved olefin polymerization catalyst obtained by bringing together a catalyst component A formed by grinding a magnesium halide or manganous halide with a catalyst adjuvant comprising aryl carbonic acid esters and treating the resulting product with a tetravalent titanium compound, and isolating the resulting composite (component A) which is combined with a cocatalyst system designated as catalyst component B. In accordance with a further aspect, catalyst component B comprises at least one of an organoaluminum compound and an organoaluminum monohalide with or without an aromatic ester as part of the cocatalyst system. In accordance with a further aspect, an improved polymerization catalyst comprising a component A which is produced by milling a magnesium or manganese dihalide with an aryl carbonate and treating the resulting product with titanium tetrachloride and combining the resulting composite (component A) with catalyst component B comprising at least one of an organoaluminum compound and an organoaluminum monohalide, with or without an aromatic ester as part of the cocatalyst sytem, is used for the polymerization of 1-olefins such as ethylene and propylene.

In the field of catalytic polymerization of olefins such as propylene to produce useful solid polymers, a continuing objective is to increase productivity. By productivity is meant the amount of useful solid polymer that is obtained by means of a given quantity of catalytic materials. This is important because the removal of catalytic materials from the solid polymer is almost always necessary and is generally troublesome or expensive to carry out. Thus, improved polymerization processes are desired in which the productivity of the polymer per unit of the catalyst material is so great that the amount of catalyst residues remaining in the polymer is insignificant and the catalyst removal steps can be minimized or omitted. The present invention is directed to improved polymerization catalyst capable of yielding greater amounts of useable polymer per unit of catalyst in comparison with known polymerization catalysts.

Accordingly, an object of this invention is to provide an improved polymerization catalyst.

A further object of this invention is to provide an improved process for the production of olefin polymers.

A further object of this invention is to provide a catalyst system adapted to produce large quantities of solid polymer per unit of catalyst.

A further object of this invention is to provide an improved polymerization process in which the productivity of the polymer per unit of catalyst material is substantially greater than known polymerization catalysts.

Other objects, aspects, as well as the several advantages of the invention, will be apparent to those skilled in the art upon reading the specification and the appended claims.

In accordance with the invention, a catalyst is provided which forms on mixing a catalyst component A formed by milling together a magnesium halide or manganous halide with a catalyst adjuvant comprising an aryl carbonic acid ester and treating the resulting product with a halogenated tetravalent titanium compound and combining the resulting composite with a cocatalyst component B comprising at least one of an organoaluminum compound and an organoaluminum monohalide with or without an aromatic ester or other additive as part of the catalyst system.

In accordance with the invention set forth in said copending application, the catalyst adjuvants comprise selected hydrocarbyl oxides, organophosphites, phenols, aromatic ketones, organosilanols, organophosphates and phosphines, amines, oxygenated terpenes, carbonic acid esters, and selected organophosphorus compounds.

Further, in accordance with the invention, alpha-olefins are polymerized under polymerization conditions employing the above catalysts.

In accordance with another embodiment of the invention, a catalyst is prepared by mixing (1) a catalyst component A formed by milling magnesium or manganese dihalide with at least one catalyst adjuvant as defined herein and treating the resulting milled product with a halogenated tetravalent titanium compound with (2) a catalyst component B comprising at least one of an organoaluminum compound and an organoaluminum monohalide with or without an aromatic ester as part of the cocatalyst system.

In accordance with a specific embodiment, catalyst component A is formed by grinding together (1) a magnesium halide or manganous halide with (2) an aryl carbonic acid ester (3) treating the milled product with $TiCl_4$ neat or in solution with a solvent inert in the process, e.g., n-heptane, benzene, cyclohexane, etc., for a time sufficient to incorporate $TiCl_4$ on at least a portion of the surface thereof, and (4) washing excess $TiCl_4$ out with an inert solvent, such as n-heptane, and drying the resulting composite.

A broad range of olefins can be polymerized by the process and catalyst system of the present invention. Commercial value can be visualized presently with alpha-olefins which have from 2 to about 10 carbon atoms. The invention finds particular usefulness with either ethylene or propylene which is polymerized to produce polyethylene or polypropylene, respectively. Mixtures of the alpha-olefins can be used. High ratios of polypropylene to catalyst were obtained employing the catalyst and process of the present invention.

As indicated above, catalyst component A is formed by milling or grinding together a magnesium halide or manganous halide with an aryl carbonate catalyst adjuvant. Magnesium dihalide and manganese dihalide are generally used, and magnesium dichloride is a presently preferred magnesium halide.

The primary additives or catalyst adjuvants contemplated in the preparation of catalyst component A are selected from among carbonic acid esters of the formula

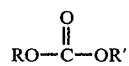

in which R is a hydrocarbyl group containing from 6 to about 20 carbon atoms selected from among aryl, aralkyl, alkaryl and the like and R' is the same as R or hydrogen. Exemplary compounds include monophenyl carbonate, monoxylyl carbonate, diphenyl carbonate, di-2-tolyl carbonate, dibenzyl carbonate, di-3-tolyl carbonate, di-4-tolyl carbonate, di-xylyl carbonate, di-2-naphthyl carbonate, 4,4'-(alpha, alpha-dimethylbenzyl)-diphenyl carbonate, 4,4'-(alpha, alpha-di-n-propylbenzyl) carbonate and the like. The aryl carbonic acid esters are known compounds which can be preprepared according to processes disclosed in U.S. Pat. Nos. 4,045,464 and 4,096,168, for example, which are incorporated herein by reference.

The molar ratios of magnesium halide and manganous halide to catalyst adjuvant additive used in forming catalyst component A can range from about 4:1 to about 100:1. The magnesium halide and manganous halide support and the catalyst adjuvant materials for catalyst component A are admixed in a suitable milling means under intensive milling conditions. The milling employed is to be distinguished from ordinary admixing, shaking, or tumbling or the like. The milling refers to the strong and thorough mixing of the solid ingredients together, milling under milling conditions, in such a manner as to afford significant reduction in the particle size. Milling can be by means of a ball mill, vibrating ball mill, tower mill, or the like. A typical, specific mill employable is a vibratory mill, such as a Vibratom, manufactured by Siebtechnik G. M. B. H.

Milling can employ ambient, vacuum or other subatmospheric, or superatmospheric, pressure, in an inert, dry atmosphere such as nitrogen, argon, or the like. Milling can result in heat being produced and where needed cooling means can be employed to avoid excessive temperatures over such as about 150° F. (65° C.) which would adversely affect catalytic performance. Milling times can range widely, such as from about 5 to about 200 hours, presently preferred from about 10 to about 175 hours because the catalysts are sufficiently activated after such milling times. No advantage in activity is gained by exceeding the specified times. Vibratory milling typically takes a shorter time than rotary ball milling.

Magnesium halide, manganous halide, preferably the chlorides, some or both, are employed substantially anhydrous, and in the form of a finely divided powder. The magnesium or manganous halide can be preactivated by a grinding operation prior to the milling step used to form component A though this preactivation is not considered generally necessary.

Usually, the anhydrous magnesium chloride or manganous chloride is added to the milling means prior to addition of the catalyst adjuvant material or additive of component A so the order of addition is not critical.

The milled product of magnesium halide or manganous halide and the catalyst adjuvant materials of catalyst component A is reacted with a titanium tetrahalide, usually the tetrachloride for convenience, at a temperature ranging from about 0° to 200° C. To improve distribution of the Ti compound the reaction can be carried out in a hydrocarbon diluent which is inert in the process as, for example, isobutane, n-heptane, cyclohexane, benzene, gasoline, and the like, for a period of time ranging from about 10 minutes to several hours, i.e., 5 hours. Suitably, if an alkane such as n-heptane is used as the diluent, the reaction can be conducted by refluxing the mixture for 1 hour, for example. The reaction is conducted in the absence of water, and oxygen is excluded by operating with a dry gas purge, i.e., nitrogen, argon, etc.

The treated product is cooled to room temperature, the liquid decanted, and the slurry is washed with several portions of dry alkane, for example, and dried, if desired.

The Ti content of the finished catalyst generally ranges from about 0.1 to about 10 wt. % based on the dry composite. This corresponds to about 0.5 to 70 mmoles titanium tetrahalide per mole of magnesium or manganous halide present.

The weight ratio of the $MgCl_2$-additive composite to the titanium tetrahalide applied thereto can range from about 0.01:1 to 10:1.

It is within the scope of the invention to utilize more than one of the defined additives in preparing catalyst component A. In addition, catalyst component A can be admixed with a diluent in particulate form such as polyethylene, polypropylene, poly(methyl methacrylate), silica, alumina, calcium carbonate and the like. If a polymer is employed, its melting or softening temperature should be higher than the reaction temperature. Suitably, the diluent is admixed with the $MgCl_2$ and additive or additives during the milling operation. The weight ratio of $MgCl_2$-additive mixture to diluent can range from about 0.1:1 to 50:1.

Catalyst component B comprises one or more organometal compounds selected from among trihydrocarbylaluminum compounds and dialkylaluminum halides. The compounds are described by the generic formulas Al $R_3$ where the R is as previously described and $(R'')_2Al\ X$ wherein R'' is an alkyl group containing from 1 to about 20 carbon atoms, and X is bromine, chlorine or iodine. Exemplary compounds include trimethylaluminum, triethylaluminum, trieicosylaluminum, triphenylaluminum, tribenzylaluminum, tricyclohexylaluminum, dimethylaluminum bromide, diethylaluminum chloride, dibutylaluminum iodide, dieicosylaluminum chloride, and the like.

Generally, when ethylene is to be polymerized, a single organoaluminum such as triethylaluminum or triisobutylaluminum is employed. When a branched chain 1-olefin such as propylene is to be polymerized, the catalyst system consists of a trihydrocarbylaluminum compound and preferably an aromatic ester, e.g., ethyl anisate, ethyl benzoate, etc., to improve stereospecificity and optionally a dialkylaluminum halide compound to increase polymer yields.

Particularly applicable compounds for improving stereospecificity are esters represented by the formula

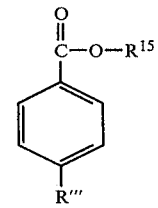

wherein $R^{15}$ represents alkyl groups having from 1 to about 4 carbon atoms and wherein R''' represents monovalent radicals selected from the group consisting of —F, —Cl, —Br, —I, —OH, —OR', —OOCR', —SH, —NH$_2$, —NR$_2$', NO$_2$, —CN, —CHO, —COR', —COOR', —CONH$_2$, CONR$_2$', —SO$_2$R', —CF$_3$, —NHCOR', and hydrogen. Some examples of such compounds are ethyl benzoate, ethyl anisate (p-methoxybenzoate), ethyl p-dimethylaminobenzoate, ethyl p- fluorobenzoate, ethyl p-cyanobenzoate, methyl benzoate, isopropyl p-diethylaminobenzoate, butyl p-fluorobenzoate, n-propyl p-cyanobenzoate, ethyl p-trifluoromethylbenzoate, methyl p-hydroxybenzoate, ethyl p-methoxycarbonylbenzoate, methyl p-acetylbenzoate, isopropyl p-formylbenzoate, methyl p-nitrobenzoate, ethyl p-carbamoylbenzoate, methyl p-mercaptobenzoate and mixtures thereof.

The molar ratio of $AlR_3$ to titanium compound can range from about 1:1 to 2000:1. The molar ratio of $(R'')_2Al\ X$ to titanium compound can range from about 0.5:1 to 2000:1. The molar ratio of $AlR_3$ to $(R'')_2Al\ X$ can range from about 0:1 to 100:1. The molar ratio of $AlR_3$ to aromatic ester can range from about 1:1 to 8:1. Desirably, when polymerizing propylene, a molar ratio of $AlR_3$ to $(R'')_2Al\ X$ of about 0.7:1 to about 50:1 is employed.

The catalyst components can be individually introduced into the polymerization reaction zone. The desired amounts can be added directly, or flushed in with portions of diluent, as may be convenient. The particular order of addition to the polymerization reactor means does not appear to be critical. Components A and B are usually not premixed before charging to the reactor. Any order of charging can be employed.

Polymerization can be carried out under conditions known in the art, such as in a liquid phase in the presence or absence of a diluent substantially inert under the reaction conditions employed, or reactions can be carried out in the vapor phase.

It presently is preferred to polymerize propylene in liquid propylene in the absence of an inert diluent because separation of components is simplified and good results are obtained.

Ethylene presently is preferably polymerized in a diluent, though other alpha monoolefins conveniently need not be. Typical suitable diluents include n-butane, isobutane, pentane, n-hexane, n-heptane, n-octane, cyclohexane, methylcyclohexane, and the like, or other saturated aliphatic hydrocarbons, alone, or in admixture.

Polymerization temperatures employed can range widely, as convenient and desirable for the equipment, monomer, and the like. Exemplary temperatures of polymerization lie in the range of about −80° C. to 150° C., presently preferred about 15° C. to 120° C. Polymerization temperatures can vary somewhat depending on the particular monomer, employment of diluent, and the like. For example, the polymerization of propylene using liquid propylene phase conveniently is carried out in the range of about 24° C. to 80° C., presently preferred about 49° C. to 75° C. because of better results with regard to productivity and solubles.

Polymerization pressures can range widely, as convenient, depending on whether vapor phase or liquid phase conditions are employed, whether diluent is employed, and the like. Where liquid phase operation is desired, with or without diluent, the pressure employed should be sufficient to maintain reactants and diluent substantially in the liquid phase.

Control of the molecular weight of the polymeric product can be exerted by including small amounts of hydrogen during polymerization, and this normally is considered advantageous. The presence of hydrogen tends to decrease the molecular weight of the polymeric products.

The polymerization process can be conducted either continuously or batchwise, as may be convenient depending on desired output, equipment, and the like.

Of course, the catalyst components employed are, to some extent, sensitive to poisons, such as water, air, and the like. Equipment, diluent, alpha-monoolefin, and the like all should be maintained in substantially anhydrous conditions or dried prior to employment. An atmosphere inert to the components should be maintained in substantially anhydrous conditions or dried prior to employment. An atmosphere inert to the components should be employed, such as nitrogen, argon, helium, n-hexane, and the like. Polymerization starts almost immediately on combination of the catalyst components with the monomer and is generally terminated within about two hours.

After completion of the polymerization reaction, or after suitable residence time in the reaction zone to obtain desired conversion, the contents of the reactor means then are discharged. The catalyst can be inactivated by treating with an agent such as a lower alcohol such as ethanol or methanol, the mixture then separated, and the polymer isolated. The polymer recovered can be purified as desired by such as drying under vacuum, and the like. The polymeric product can be treated for removal of solubles by contacting with n-hexane, n-heptane, etc., which dissolves the soluble amorphous material and leaves a white, solid, predominantly crystalline polymer as the final product.

EXAMPLE

Two catalysts were prepared by intensive ball milling of individual samples of $MgCl_2$ (15 g, 158 mmoles) and either diphenyl carbonate (11.5 mmoles) or diethyl carbonate (11.5 mmoles). In each case, the mole ratio of $MgCl_2$:additive was 13.7:1. Each sample was subjected to milling for 42 hours with a cooling tap water spray on the outside of the vessel by employing a Vibratom vibratory mill, model 6L-b, a product of Siebtechnik GMBH, Mulheim, West Germany, which operated at a frequency of 1135 cycles per minute at an amplitude of about 10 mm. The milling took place at ambient temperature in an unheated room as described above. The temperature of the milled compositions reached from about 120°–140° F. (49°–60° C.) during the milling process.

While under a dry nitrogen purge, three grams of each milled sample was charged to a vessel equipped for stirring and refluxing, to which was added 50 mL of dry n-heptane and 20 mL of $TiCl_4$ (34.5 g) and refluxed for 1 hour (about 100° C.). After the reaction period, stirring was discontinued, the mixture was cooled to about room temperature, and the supernatant liquid removed by decanting. The product (slurry) was washed to remove unreacted titanium tetrachloride by contact with dry n-hexane while being stirred. Stirring was discontinued, the solids left to settle, and the supernatant liquid removed by decanting. The washing process was repeated using dry n-pentane as the contacting fluid. After decanting the supernatant liquid, the product was dried over a warm water bath, 50° C., in a current of dry nitrogen.

Each catalyst component A thus prepared was tested for propylene polymerization by charging catalyst component A to a reactor as detailed below with triethylaluminum (TEA), ethyl anisate (EA) and diethylaluminum chloride (DEAC) as the cocatalyst system.

To a dry, stirred, stainless steel reactor of one gallon (3.8 liters) capacity at 70° C. was charged in order under a gaseous propylene purge 2.8 mmoles TEA, 1.6 mmoles EA, 2.8 mmoles DEAC, and catalyst component A. The reactor was sealed, hydrogen added from a 360 mL bomb having a pressure of 50 psig (345 kPa) and liquid propylene was charged. The reactor temperature was adjusted to 70° C., and the reactor filled liquid full with additional liquid propylene. The liquid full condition was maintained during each one-hour polymerization run by adding more propylene as required.

Each run was terminated by injecting methanol into the reactor, and the reactor and contents cooled to about room temperature. The reactor was drained, and the solid polymer recovered, dried, and weighed. Soluble polymer in the liquid propylene effluent was determined by flashing off the propylene and weighing the dried residue.

The results of these runs are set forth below:

| Run No. | Additive | Cat. Wt. g | Productivity **solid g/g | Propylene Soluble PHI* |
|---|---|---|---|---|
| 1 | diphenyl carbonate | 0.0433 | 15041 | 2.3 |
| 2 | diethyl carbonate (control) | 0.0363 | 9930 | 2.4 |

*PHI = parts propylene soluble per hundred of propylene insoluble.
**grams polymer per gram catalyst.

Inspection of the data indicates that the invention catalyst employing diphenyl carbonate in catalyst component A was very active for propylene polymerization on the basis of superior productivity and relatively low soluble polymer formation.

We claim:

1. A catalyst which forms on mixing:
   A. a catalyst component A formed by milling
      (1) a magnesium halide or manganous halide with
      (2) at least one carbonic acid ester of the formula

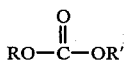

wherein R is an aryl group having from 6 to about 20 carbon atoms and R' is the same as R or hydrogen,
      (3) treating the composite thus obtained from (1) and (2) with a tetravalent titanium halide for a period of time sufficient to incorporate titanium tetrahalide on at least a portion of the surface of said milled composite; and
   B. a cocatalyst component B comprising an organoaluminum compound wherein the molar ratio of component B to titanium compound ranges from 0.5:1 to 2,000:1 and the amount of titanium present in the finished catalyst ranges from about 0.1 to about 10 weight percent based on the dry composite.

2. A catalyst according to claim 1 which additionally contains an aromatic ester as part of cocatalyst component B and wherein the molar ratio of B to aromatic ester is about 1:1 to 8:1.

3. A catalyst according to claim 1 wherein (2) is diphenyl carbonate.

4. A catalyst according to claim 1 wherein (1) is $MgCl_2$ and (3) is $TiCl_4$.

5. A catalyst according to claim 4 wherein B comprises triethylaluminum and the catalyst additionally contains ethyl anisate and diethylaluminum chloride.

6. A catalyst according to claim 5 wherein (2) is diphenyl carbonate.

7. A catalyst according to claim 1 further including a solid particulate material which is inert to the catalyst components.

8. A catalyst according to claim 7 wherein the solid particulate material is selected from silica, alumina, calcium carbonate and solid organic material selected from polyvinyltoluene, polycarbonate, polyethylene, polypropylene, polystyrene, polymethylmethacrylate and mixtures thereof.

9. A catalyst according to claim 8 wherein said solid particulate materials are milled in the presence of (1) and (2).

10. A catalyst according to claim 1 wherein the catalyst composite obtained after treating the product of (1) and (2) with (3) is washed with an inert solvent to remove excess titanium tetrahalide and the resulting composite is dried prior to combining with cocatalyst component.

11. A method for preparing a catalyst comprising:
   milling together a manganese halide or manganous halide with a carbonic acid ester of the formula

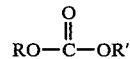

wherein R is an aryl group having from 6 to about 20 carbon atoms and R' is the same as R or hydrogen under conditions and for a period of time sufficient to form a finely divided milled composite;
   reacting the milled composite with a titanium tetrahalide under conditions and for a period of time sufficient to incorporate titanium tetrahalide on at least a portion of the surface of the milled composite; and
   washing the solid catalyst thus formed and recovering catalyst component A which is effective for olefin polymerization.

12. A method according to claim 11 wherein the catalyst composite obtained after reacting with a titanium tetrahalide is washed with an inert solvent to remove excess titanium tetrahalide.

13. A method according to claim 12 wherein said milled composite is reacted with titanium tetrahalide at a temperature ranging from about 0° to about 200° C. and the product treated with titanium tetrahalide is cooled under ambient conditions prior to washing.

14. A method according to claim 11 wherein said milled composite reacted with titanium tetrahalide is combined with a cocatalyst component B comprising an organoaluminum compound.

* * * * *